United States Patent Office 2,840,572
Patented June 24, 1958

---

2,840,572

CHEMICAL COMPOUNDS AND PROCESSES FOR PREPARING THE SAME

Earl M. Chamberlin, Westfield, and John M. Chemerda, Metuchen, N. J., assignors to Merck & Co., Inc., Rahway, N. J., a corporation of New Jersey No Drawing. Application December 2, 1955
Serial No. 550,776

13 Claims. (Cl. 260—397.1)

This application is a continuation-in-part of our pending application, Serial No. 288,564, now abandoned, filed May 17, 1952, which in turn is a continuation-in-part of Serial No. 240,051, now abandoned, filed August 2, 1951.

This invention is concerned with novel chemical compounds of the cyclopentanopolyhydrophenanthrene series, and processes for preparing the same; more particularly, it relates to novel cyclopentanopolyhydrophenanthrene compounds consisting of 3-hydroxy-7-keto-$\Delta^8$ unsaturated compounds and 3-hydroxy-7-keto-$\Delta^{9(11)}$ usaturated compounds, and to processes for the preparation of such compounds.

It is also concerned with the preparation of novel chemical compounds of the cyclopentanopolyhydrophenanthrene series consisting of 3,7,8-trihydroxy-$\Delta^{9(11)}$ steroid compounds and 3,9,11-trihydroxy-$\Delta^7$ steroid compounds, which compounds are produced as intermediates in the present process.

Compounds of the adrenal cortex, such as Kendall's compound E (cortisone), have been found to be of great value in the treatment of various diseases. Further, it is likely that Kendall's compound E and/or other closely related 11-hydroxy steroids will find increasing therapeutic use in the future. Unfortunately, the only method for the preparation of such compounds presently available utilizes desoxycholic or cholic acids as the starting material. Cholic and desoxycholic acids have hydroxy substituents in ring C at the 12-position, thus providing a means for introducing a functional substituent in the 11-position. However, cholic and desoxycholic acids which are obtained from animal bile are only available in limited amounts. Heretofore, no practical method was available whereby a functional group could be introduced in ring C which will permit the use of more abundant steroids such as the sterols ergosterol, cholesterol, stigmasterol, or plant sapogenins such as diosgenin, tigogenin, and the like.

It is an object of the present invention to provide a process for introducing a functional group in ring B at the 7-position, which compounds can be converted to cortisone, by a process described in pending sole application of one of the present applicants, Serial No. 240,052, now U. S. Patent No. 2,734,897, filed August 2, 1951, which was filed simultaneously with our parent application Serial No. 240,051.

The compounds forming the subject matter of the present invention are believed to be represented by the formulae:

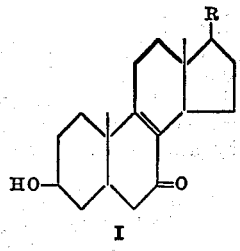

I and

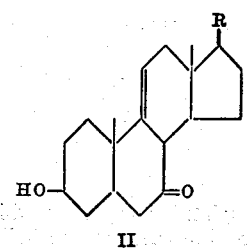

II wherein R is either a sterol side chain (such as ergosterol), a bile acid side chain (such as cholanic acid), a degraded bile acid side chain (such as bisnorcholanic acid), a pregnane side chain (—CO—CH$_3$), or a sapogenin side chain (such as tigogenin).

In accordance with our invention, these new compounds may be prepared by employing starting materials selected from the group consisting of hemi-epoxylated and hemi-hydroxylated steroids containing double bonds in the $\Delta^7$, $\Delta^8$ or $\Delta^{9(11)}$ positions. The hemi-epoxylated compounds having a double bond in the $\Delta^7$ or $\Delta^{9(11)}$ position which may be employed as starting materials in our process, are believed to have in rings B and C the structure

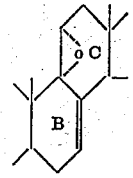

or

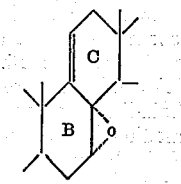

The hemi-hydroxylated compounds corresponding to the hemi-epoxylated compounds above and having a double bond in the $\Delta^7$ or $\Delta^{9(11)}$ position which may be employed as starting materials, are believed to have in rings B and C the structure

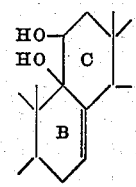

or

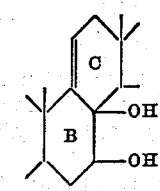

The hemi-hydroxylated compound having a double bond in the $\Delta^8$ position which may be used as starting materials in our process are believed to have in rings B and C, the structure

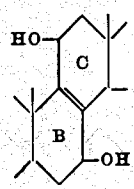

The hemi-epoxylated compounds which may be employed in our novel process may be indicated by the following complete formula:

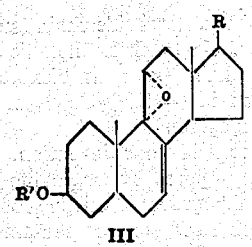

or

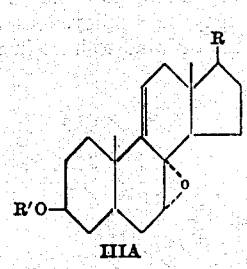

wherein R is as above, and R' is hydrogen or an acyl group.

A compound of the Formula III or IIIA, wherein R is a bile acid side chain (such as cholanic acid) and R' is an acyl group (namely, methyl-3-acyloxy-$\Delta^{7,9(11)}$-choladienate epoxide) can be prepared by reacting methyl-3-acyloxy-$\Delta^{7,9(11)}$-choladienate compounds with perbenzoic acid in a benzene medium. The processes for preparing methyl-3-acyloxy-$\Delta^{9(11)}$-choladienate epoxide are disclosed and claimed in our co-pending application, Serial No. 215,026, filed March 10, 1951.

In accordance with our process, methyl-3-acyloxy-$\Delta^{7,9(11)}$-choladienate epoxide can be heated with acetic anhydride at temperatures of about 150° C. to form methyl-3-acyloxy-7-keto-$\Delta^{9(11)}$-cholenate. The process can also be carried out by merely heating methyl-3-acyloxy-$\Delta^{7,9(11)}$-choladienate epoxide in the presence of an inert solvent (such as xylene) at temperatures of about 150° C. to form methyl-3-acyloxy-7-keto-$\Delta^{9(11)}$-cholenate.

A compound of the formula (III or IIIA), wherein R is the sterol side chain, such as in ergosterol, can be prepared by reacting ergosteryl D acetate with perbenzoic acid in a benzene medium. (At present, the exact structure of the epoxide is not known, and it is represented by the alternative Formula III or IIIA.) The processes for preparing ergosteryl D acetate epoxide (III or IIIA) are disclosed and claimed in our co-pending application, Serial No. 215,026, filed March 10, 1951.

Ergosteryl D acetate epoxide (III or IIIA) is reacted with aqueous acidic reagents at a temperature ranging from 20–100° C. to form a mixture of 3-hydroxy-7-keto-$\Delta^{8,22}$-ergostadiene (I) and 3-hydroxy-7-keto-$\Delta^{9(11),22}$-ergostadiene (II).

A variety of acidic reagents may be employed in this process, such as aqueous mineral acids (i. e., dilute hydrochloric or sulfuric acid), p-toluene sulfonic acid, oxalic acid, or aluminum nitrate hexahydrate. The reaction is preferably carried out in aqueous organic solvent medium, such as aqueous acetone, aqueous alcohol, or aqueous dioxane.

Instead of employing the acidic reagents mentioned above, we have found that the reaction can be carried out in water, but the reaction must then be conducted at higher temperatures, preferably at about 160° C.

The proportions of 3-hydroxy-7-keto-$\Delta^{8,22}$-ergostadiene (I) and 3-hydroxy-7-keto-$\Delta^{9(11),22}$-ergostadiene (II) present in the final product vary with the time, temperature and work-up of the reaction mixture. Usually at higher temperatures and/or longer reaction time, larger amounts of 3-hydroxy-7-keto-$\Delta^{8,22}$-ergostadiene (I) are formed. Whereas, at lower temperatures and/or shorter reaction time, 3-hydroxy-7-keto-$\Delta^{9(11),22}$-ergostadiene (II) predominates in the mixture. Pure 3-hydroxy-7-keto-$\Delta^{8,22}$-ergostadiene (I) may be recovered from the mixture by dissolving the mixture in a 50% ether acetone solution and chromatographing the solution on an acid washed alumina. 3-hydroxy-7-keto-$\Delta^{8,22}$-ergostadiene crystals separate from the eluate upon addition of sufficient acetone.

The preferred procedure for converting the ergosteryl D acetate epoxide to the mixtures of ketones, 3-hydroxy-7-keto-$\Delta^{9(11),22}$-ergostadiene and 3-hydroxy-7-keto-$\Delta^{8,22}$-ergostadiene, comprises refluxing the epoxide for about four hours in aqueous acetone or aqueous dioxane with a small amount of aqueous sulfuric acid, added as a 2 N aqueous solution. The acidity of the reaction mixture is usually in the range of a 0.2 to 0.001 normal acid solution. During this rearrangement, at least a partial hydrolysis of the 3-acyloxy group of the starting material occurs, and additional treatment with alcoholic alkali achieves complete hydrolysis and leads to a mixture in which the compound 3-hydroxy-7-keto-$\Delta^{8,22}$-ergostadiene (I) is the predominant component.

The structure of the hemi-hydroxylated compounds having a double bond in the $\Delta^7$ or $\Delta^{9(11)}$ position employed as starting materials in our process have not been definitely established but are believed to be represented by the formulae

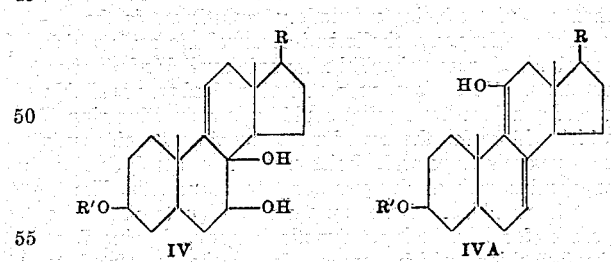

Compounds wherein R' is hydrogen and R is a sterol side chain, such as in ergosterol, namely 3,7,8-trihydroxy-$\Delta^{9(11),22}$-ergostadiene (IV) or 3,9,11-trihydroxy-$\Delta^{7,22}$-ergostadiene (IVA), are prepared by reacting ergosteryl D acetate with osmium tetroxide and the intermediate osmate esters are hydrolyzed, such as by treatment with sodium sulfite, sodium bicarbonate, or aqueous mannitol.

The glycols thus formed, 3,7,8-trihydroxy-$\Delta^{9(11),22}$-ergostadiene or 3,9,11-trihydroxy-$\Delta^{7,22}$-ergostadiene are converted to 3-hydroxy-7-keto-$\Delta^{8,22}$-ergostadiene and 3-hydroxy-7-keto-$\Delta^{9(11),22}$-ergostadiene, by treatment with aqueous acidic reagents at a temperature ranging from 20–100° C. or by heating with water at 100° C. in a sealed tube.

Our novel cyclopentanopolyhydrophenanthrene compounds consisting of 3-hydroxy-7-keto-$\Delta^8$-unsaturated compounds and 3-hydroxy-7-keto-$\Delta^9$-unsaturated compounds may also be prepared from a hemi-hydroxylated steroid believed to be represented by the formula

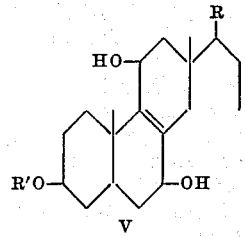

wherein R and R' are as above.

A compound of the above formula, wherein R' is acetyl and R is a sterol side chain, such as in ergosterol (i. e., 3-acetoxy-7,11-dihydroxy-$\Delta^{8,22}$-ergostadiene) is reacted with sulfuric acid in a dioxane solvent. The reaction mixture is concentrated and water added. Whereupon a mixture of 3-hydroxy-7-keto-$\Delta^{8,22}$-ergostadiene and 3-hydroxy-7-keto-$\Delta^{9(11),22}$-ergostadiene separates from solution and is recovered.

A $\Delta^{8(9)}$-7-keto-cyclopentanopolyhydrophenanthrene compound, a $\Delta^{9(11)}$-7-keto-cyclopentanopolyhydrophenanthrene compound or a mixture of these compounds, is reacted with an acylating agent to produce the corresponding enol acylate, that is, the $\Delta^{7,9(11)}$-7-acyloxy-cyclopentanopolyhydrophenanthrene; the latter compound is treated with an organic peracid, whereby the double bond connecting the 9- and 11-carbon atoms is replaced by a 9,11-epoxide linkage, thereby forming the corresponding $\Delta^7$-7-acyloxy-9,11-epoxy-cyclopentanopolyhydrophenanthrene. This latter compound is converted by reaction with an alcoholic solution of an alkali metal hydroxide to the corresponding $\Delta^{8(9)}$-7-keto-11-hydroxy-cyclopentanopolyhydrophenanthrene compound. This latter compound is reacted with an acylating agent thereby forming $\Delta^{8(9)}$-7-keto-11-acyloxy-cyclopentanopolyhydrophenanthrene.

The $\Delta^{8(9)}$-3,11-dihydroxy-7-keto-cyclopentanopolyhydrophenanthrene compounds are readily converted to steroid hormones having an oxygen atom attached to the 11-carbon atom as substantially described in U. S. Serial No. 240,052 as follows: The $\Delta^{8(9)}$-3,11-dihydroxy-7-keto-cyclopentanopolyhydrophenanthrene compound is reacted with zinc and acetic acid thereby forming the corresponding 3,11-dihydroxy-7-keto-cyclopentanopoly-hydrophenanthrene compound, which is heated with a diethylene glycol solution of hydrazine and potassium hydroxide to produce the corresponding 3,11-dihydroxy-cyclopentanoperhydrophenanthrene compound; this 3,11-dihydroxy-cyclopentanoperhydrophenanthrene compound is then treated according to known methods (the exact method of treatment depending upon the side chain attached to the 17-carbon atom) to convert the organic substituent attached to the 20-carbon atom to a keto radical thus forming the corresponding 3,11-dihydroxy-20-keto-pregnane. (For example, where the side chain attached to the 17-carbon atom is that present in the bile acid, bisnorallocholanic acid, the 3,11-dihydroxy-bisnorallocholanic acid is esterified, the methyl 3,11-dihydroxy-bisnorallocholanate is reacted with phenyl magnesium iodide to form 3,11-dihydroxy-20-allopregnanyl-diphenyl-carbinol; the latter compound is reacted with acetic anhydride to produce 3,11-diacetoxy-allo-etiocholanyl-methyl-dipenyl-ethylene, and this compound is treated with ozone to form 3,11-diacetoxy-20-keto-allo-pregnane.) This 3,11-diacetoxy-20-keto-allopregnane (obtained as described above starting with 3,11-dihydroxy-bisnorallocholanic acid, or if preferred by degrading the side chain of some other 3,11-dihydroxy-cyclopentanoperhydrophenanthrene compound) is then reacted with an acetic anhydride in the presence of p-toluene sulfonic acid catalyst thereby forming the corresponding $\Delta^{17}$-3,11,20-triacetoxy-pregnene; this compound is reacted with perbenzoic acid followed by a hydrolyzing agent to form 3,11,17-trihydroxy-20-keto-allopregnane; the latter compound is then reacted with bromine followed by sodium acetate thereby forming the corresponding 3,11,17-trihydroxy-20-keto-21-acetoxy-allopregnane; the 3,11,17-trihydroxy-20-keto-21-acetoxy allopregnane is then reacted with chromic acid thereby forming 3,11,20-triketo-17-hydroxy-21-acetoxy-allopregnane which is reacted with two molecular equivalents of bromine followed by rearrangement to produce the corresponding 2,4-dibromo-3,11,20-triketo-17-hydroxy-21-acetoxy-allopregnane; this compound is reacted with a dehydrohalogenating agent and a reducing agent to form cortisone acetate, i. e. $\Delta^4$-3,11,20-triketo-17-hydroxy-21-acetoxy-pregnene.

The following examples are presented to illustrate the specific embodiments of our invention:

EXAMPLE 1

*Preparation of methyl-3-acetoxy-7-keto-$\Delta^{9(11)}$-choladienate from methyl-3-acetoxy-$\Delta^{7,9(11)}$-choladienate expoxide*

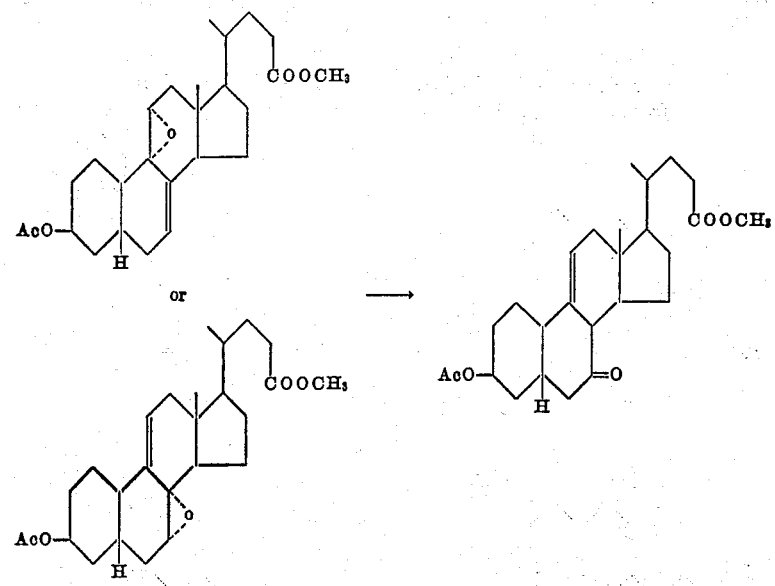

Twenty-six cc. of a benzene solution of perbenzoic acid (0.011 mol) was added over a period of one hour with stirring at 5° C. to a solution containing 4.28 g. (0.01 mol) of methyl 3-acetoxy-Δ$^{7,9(11)}$-choladienate in 100 cc. benzene.

After addition was complete, the solution was stirred for one-half hour at 5° C. and then for three hours at room temperature. One molar equivalent of perbenzoic acid was consumed.

The benzene solution was washed with 3 portions of 30 cc. of a cold 5% potassium hydroxide solution to remove the residual perbenzoic acid and other acidic material followed by ice water until neutral. The neutral benzene solution was dried over anhydrous sodium sulfate and concentrated in vacuo. A yield of 4.3 g. of crude methyl 3-acetoxy-Δ$^{7,9(11)}$-choladienate epoxide melting at 142.6° C. was obtained. This procedure is fully described and claimed in our co-pending application, Serial No. 215,026, filed March 10, 1951.

Two grams of methyl-3-acetoxy-Δ$^{7,9(11)}$-choladienate epoxide prepared as above were suspended in 20 cc. of acetic anhydride, and the suspension was heated in a sealed tube at a temperature of 150° C. for a period of about four hours. The reaction solution was cooled to room temperature whereupon large rectangular crystalline plates separated from the solution. This crystalline material was recovered by filtration, washed with acetic anhydride and dried to give about 1.1 g. of crude methyl-3-acetoxy-7-keto-Δ$^{9(11)}$-cholenate; having a melting point of 168–170° C. This material was purified by chromatography followed by recrystallization from methanol to give substantially pure methyl-3-acetoxy-7-keto-Δ$^{9(11)}$-cholenate, having a melting point of 185° C.

EXAMPLE 2

*Alternative procedure for the preparation of methyl-3-acetoxy-7-keto-Δ$^{9(11)}$-choladienate from methyl-3-acetoxy-Δ$^{7,9(11)}$-choladienate epoxide*

Five-tenths of a gram of methyl-3-acetoxy-Δ$^{7,9(11)}$-choladienate epoxide prepared as in Example 1 was suspended in 10 cc. of xylene containing 0.2 cc. of ethanol, and the suspension was heated in a sealed tube at a temperature of about 150° C. for a period of approximately fifteen hours. The solvent was evaporated from the reaction mixture under reduced pressure, and the residual material was triturated with benzin and dried to give crude methyl-3-acetoxy-7-keto-Δ$^{9(11)}$-cholenate; having a melting point of 153–157° C. This material was recrystallized once from acetone to give substantially pure methyl-3-acetoxy-7-keto-Δ$^{9(11)}$-cholenate; having a melting point of 180–182° C.

Ergosteryl D acetate epoxide, the starting material employed in this reaction, was prepared by dissolving 1 gram of ergosteryl D acetate in 30 cc. of benzene and adding 10 cc. of perbenzoic acid solution equivalent to 1.21 millimols of oxygen. After five minutes, the perbenzoic acid was consumed and the reaction mixture was transferred to a separatory funnel with 50 cc. of benzene. The solution was washed four times with 25 cc. of 1% potassium hydroxide solution and then with water until the washings were neutral. The benzene solution was dried over anhydrous sodium sulfate, filtered and the solvent removed in vacuo under nitrogen. The crude ergosteryl D acetate epoxide on recrystallization from acetone melted at 208–210° C. The procedure for preparing ergosteryl D acetate epoxide is fully described and claimed in our co-pending application, Serial No. 215,026, filed March 10, 1951.

Five hundred milligrams of ergosteryl D acetate epoxide prepared as described above was suspended in 50 cc. of acetone. The suspension was stirred and 1 cc. of a 2 N sulfuric acid solution added, whereupon a clear solution resulted. The solution was allowed to stand for eighteen hours at room temperature, then 1 cc. of 2.5 N sodium hydroxide was added and the mixture concentrated in vacuo. The residue had a melting point of 165–168° C., and ultraviolet absorption examination of the residue indicated that 3-hydroxy-7-keto-Δ$^{8,22}$-ergostadiene was present to the extent of 60–80%; λ max. 2440–2460 A., E% 162 (isooctane solvent). The remaining 40–20% was 3-hydroxy-7-keto-Δ$^{9(11),22}$-ergostadiene.

EXAMPLE 4

*Preparation of 3-hydroxy-7-keto-Δ$^{9(11),22}$-ergostadiene*

17.5 grams of ergosterol D epoxide was suspended in 3 liters of acetone. The suspension was stirred and 115 cc. of 2 N sulfuric acid solution was added. The solution was allowed to stand at room temperature for ten minutes, and then concentrated in vacuo to a volume of about 250 cc. To the concentrated solution was added 1200 cc. of ice water and the reaction mixture was filtered. The residue was washed free of acid with water and dried to yield 3-hydroxy-7-keto-Δ$^{9(11),22}$-ergostadiene, having a melting point of 142–147° C.

Purification was accomplished by dissolving the crude 3-hydroxy-7-keto-Δ$^{9(11),22}$-ergostadiene in ethyl ether and subjecting this solution to chromatography on acid washed alumina using an acetone-ether mixture for elution. The

EXAMPLE 3

*Preparation of a mixture of 3-hydroxy-7-keto-Δ$^{8,22}$-ergostadiene and 3-hydroxy-7-keto-Δ$^{9(11),22}$-ergostadiene from ergosteryl D acetate epoxide*

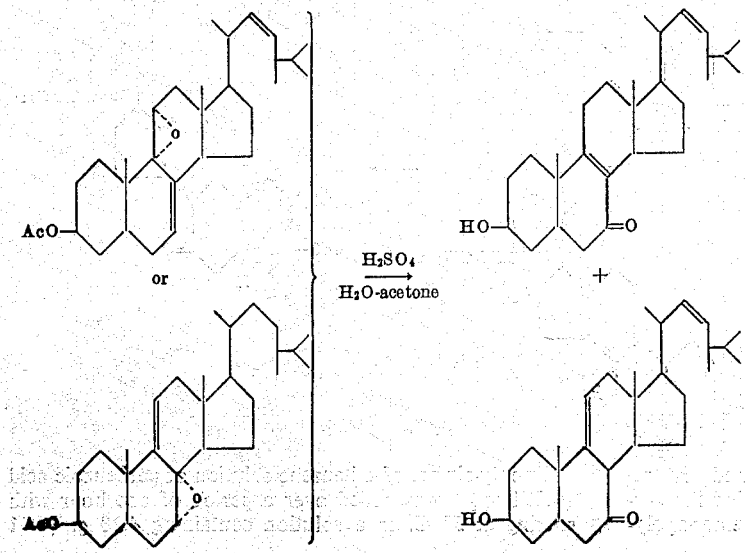

product thus obtained was further purified by a second chromatography using a mixture of methanol-ether for elution.

The purified 3-hydroxy-7-keto-$\Delta^{9(11),22}$-ergostadiene melted at 153.5–154.5° C., had a specific rotation of $[\alpha]_D^{23} = -53°$ in chloroform and absorption above 220 m$\mu$.

*Analysis.*—Calculated for: $C_{28}H_{44}O_2$: C, 81.52; H, 10.74. Found: C, 82.10; H, 10.40.

The 3-acetoxy-7-keto-$\Delta^{9(11),22}$-ergostadiene has a melting point of 176–177° C. and a specific rotation of $[\alpha]_D = -43.5°$ in chloroform.

*Analysis.*—Calculated for: $C_{30}H_{46}O_3$: C, 79.26; H, 10.20. Found: C, 78.89; H, 9.91.

EXAMPLE 5

*Preparation of a mixture of 3-hydroxy-7-keto-$\Delta^{8,22}$-ergostadiene and 3-hydroxy-7-keto-$\Delta^{9(11),22}$-ergostadiene from ergosteryl D acetate epoxide*

To a mixture of three grams of ergosteryl D acetate epoxide, 120 cc. of dioxane and 30 cc. of water was added 6 cc. of 2 N sulfuric acid. The resulting cloudy mixture was heated to 80–90° C. for five minutes, whereupon the mixture became clear. The clear mixture was allowed to stand at room temperature for twelve hours and crystals in the form of needles separated from solution. The crystals which were recovered weighed 940 milligrams, had a melting point of 172–180° C., and consisted principally of 3-hydroxy-7-keto-$\Delta^{9(11),22}$-ergostadiene together with a small amount of 3-hydroxy-7-keto-$\Delta^{8,22}$-ergostadiene as indicated by the ultraviolet absorption $\lambda$ max. 2440 A., $E_{1\,cm}^{\%}$ 4.16 (isooctane solvent)

2,4-dinitrophenyl-hydrazine reacted with the reaction mixture prepared under the above conditions yielded a 2,4-dinitro-phenylhydrazone of 3-hydroxy-7-keto-$\Delta^{9(11),22}$-ergostadiene which possessed $\lambda$ max. 375 m$\mu$, $E_{1\,cm}^{\%}$ 356 (in chloroform)

EXAMPLE 6

*Preparation of 3-hydroxy-7-keto-$\Delta^{8,22}$-ergostadiene and 3-acetoxy-7-keto-$\Delta^{8,22}$-ergostadiene from ergosteryl D acetate epoxide*

Five hundred milligrams of ergosteryl D acetate epoxide was dissolved in 20 cc. of hot dioxane and the mixture diluted with 5 cc. of water. To the cloudy reaction mixture was added 1 cc. of 2 N sulfuric acid solution, whereupon the solution cleared. The reaction mixture was heated for twenty-four hours and then concentrated upon the addition of water. The solid product, a mixture of 3-hydroxy-7-keto-$\Delta^{8,22}$-ergostadiene and 3-hydroxy-7-keto-$\Delta^{9(11),22}$-ergostadiene crystallized from solution. The crystals which were recovered melted at 148–157° C. and had an ultraviolet absorption $\lambda$ max. 2540 A., E% 150–180 (alcohol solvent).

Pure 3-hydroxy-7-keto-$\Delta^{8,22}$-ergostadiene was obtained by dissolving the mixture in a 50% ether-acetone solution and chromatographing the solution on 15 grams of acid-washed alumina. From the 50% ether-acetone eluate, 3-hydroxy-7-keto-$\Delta^{8,22}$-ergostadiene was obtained by crystallization from acetone. The 3-hydroxy-7-keto-$\Delta^{8,22}$-ergostadiene thus obtained possessed the physical characteristics:

Melting point: 179–180° C.
Ultraviolet absorption:

$\lambda$ max. 246 m$\mu$, $E_{1\,cm}^{\%}$ 240 (isooctane solvent)

$\lambda$ max. 254 m$\mu$, $E_M$ 9970 (alcohol)

Specific rotation: $\alpha_D$ —43.1° (1% chloroform).
*Analysis.*—Calculated for $C_{28}H_{44}O_2$: C, 81.52; H, 10.74. Found: C, 81.53; H, 10.67.

3-hydroxy-7-keto-$\Delta^{8,22}$-ergostadiene was reacted with boiling acetic anhydride to yield 3-acetoxy-7-keto-$\Delta^{8,22}$-ergostadiene which was further purified by crystallization from methanol-acetone as needles:

Melting point: 213–213.5° C.
Specific rotation: $\alpha_D$ —58.6° (1.19% in chloroform).
Calculated for $C_{30}H_{46}O_3$: C, 79.24; H, 10.20. Found: C, 79.81; H, 10.10.

EXAMPLE 7

*Preparation of 3-hydroxy-7-keto-$\Delta^{8,22}$-ergostadiene*

One hundred grams of ergosterol D epoxide was suspended in 5 liters of absolute ethanol. To the suspension was added 500 cc. of 2 N sulfuric acid. The reaction mixture was then refluxed in a nitrogen atmosphere for three hours and 6 liters of ice water was added. The reaction mixture was filtered, the residue washed free of acid with water, and air dried. The crude product was dissolved in ethyl ether and chromatographed on acid washed alumina. From the methanol ethyl ether eluate was obtained substantially pure 3-hydroxy-7-keto-$\Delta^{8,22}$-ergostadiene.

EXAMPLE 8

*Preparation of 3-hydroxy-7-keto-$\Delta^{8,22}$-ergostadiene and 3-acetoxy-7-keto-$\Delta^{8,22}$-ergostadiene from ergosteryl D acetate epoxide*

One and two-tenths grams of ergosteryl D acetate epoxide in 50 cc. of dioxane and 5 cc. of water was heated at 160° C. in a sealed tube for sixteen hours. Concentration of the reaction mixture and dilution with water yielded a mixture of 3-hydroxy-7-keto-$\Delta^{8,22}$-ergostadiene and its 3-acetoxy derivative, 3-acetoxy-7-keto-$\Delta^{8,22}$-ergostadiene, which was separated conveniently by chromatography over alumina.

EXAMPLE 9

*Preparation of a mixture of 3-hydroxy-7-keto-$\Delta^{8,22}$-ergostadiene and 3-hydroxy-7-keto-$\Delta^{9(11),22}$-ergostadiene from ergosteryl D acetate epoxide*

One gram of aluminum nitrate hexahydrate in 2 cc. of water was diluted with 50 cc. of acetone. Five hundred milligrams of ergosteryl D acetate epoxide was added and the mixture was refluxed for two hours. The product, a mixture of 3-hydroxy-7-keto-$\Delta^{8,22}$-ergostadiene and 3-hydroxy-7-keto-$\Delta^{9(11),22}$-ergostadiene, was precipitated by the addition of water; yield 500 mg., melting point 155–168° C. By recrystallization from acetone the melting point was raised to 172–174.5° C.

EXAMPLE 10

*Preparation of a mixture of 3-hydroxy-7-keto-$\Delta^{8,22}$-ergostadiene and 3-hydroxy-7-keto-$\Delta^{9(11),22}$-ergostadiene from ergosteryl D acetate epoxide*

Ergosteryl D acetate epoxide in 100 cc. anhydrous ether was reacted at room temperature with 420 mgs. p-toluene sulfonic acid monohydrate and 225 mg. acetic anhydride. On stirring, the reagents went into solution and the reaction mixture was allowed to stand for 48 hours. The reaction mixture was washed with three portions of 30 cc. 5% sodium carbonate solution and one 50 cc. portion of water. After drying over anhydrous sodium sulfate and concentrating to dryness, a crystalline residue consisting of a mixture of 3-hydroxy-7-keto-$\Delta^{8,22}$-ergostadiene and 3-hydroxy-7-keto-$\Delta^{9(11),22}$-ergostadiene was obtained which was recrystallized from alcohol. This mixture possessed the following physical characteristics:

Melting point: 163–165° C.

Ultraviolet absorption:

λ max. 2540 A., $E_{1cm}^{\%}$ 100 (alcohol)

Analysis.—Calculated for: $C_{28}H_{44}O_2$: C, 81.52; H, 10.74. Found: C, 81.08; H, 10.06.

EXAMPLE 11

Preparation of 3-hydroxy-7-keto-Δ[8,22]-ergostadiene and 3-hydroxy-7-keto-Δ[9(11),22]-ergostadiene from 3-acetoxy-7,11-dihydroxy-Δ[8,22]-ergostadiene

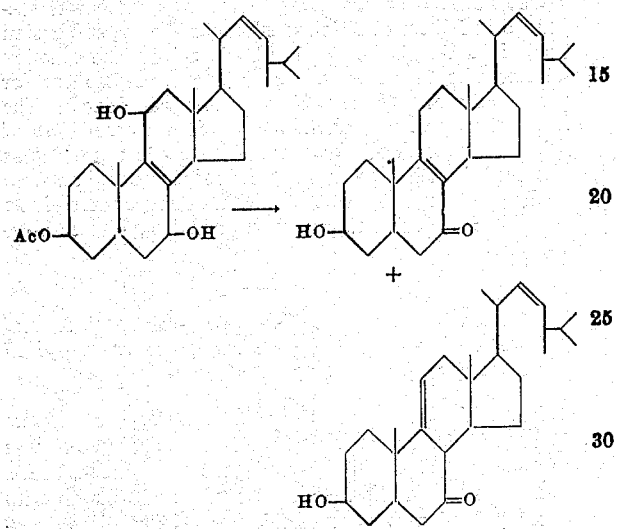

The starting material in the reaction, 3-acetoxy-7,11-dihydroxy-Δ[8,22]-ergostadiene, was prepared by dissolving 309 grams of ergosteryl D acetate in 1876 cc. of benzene and oxidizing at 10–15° C. with 107.6 grams of perbenzoic acid in 1775 cc. of benzene. The reaction mixture was allowed to stand overnight. It was washed twice with 630 cc. of a 5% potassium hydroxide solution, three times with 1000 cc. of water and dried over anhydrous magnesium sulfate.

Seventy cubic centimeters of the above solution was diluted with an additional 50 cc. of benzene and 100 grams of acid washed alumina was added. After standing four days, the alumina was filtered off and washed as follows:

1000 cc. benzene at room temperature
6×300 cc. methanol at room temperature
500 cc. boiling methanol
500 cc. boiling chloroform The product from the cold methanol washes was taken up in hot methanol/chloroform and insoluble material was removed by filtration. On concentrating the filtrate to a small volume and seeding, 820 mg. of 3-acetoxy-7,11-dihydroxy-Δ[8,22]-ergostadiene (M. P. 238.5–240.5° C.) was obtained.

A suspension of 300 milligrams of 3-acetoxy-7,11-dihydroxy-8,22-ergostadiene in 20 cc. of dioxane and 2 cc. of 2 N sulfuric acid was refluxed four hours. The mixture was concentrated to a small volume, and water added, whereupon a mixture of 3-hydroxy-7-keto-Δ[8,22]-ergostadiene and 3-hydroxy-7-keto-Δ[9(11),22]-ergostadiene separated from solution. The precipitate was recovered by filtration. After chromatography over alumina, pure 3-hydroxy-7-keto-Δ[8,22]-ergostadiene was isolated upon recrystallization from methanol. The pure 3-hydroxy-7-keto-Δ[8,22]-ergostadiene thus recovered had a melting point of 180–181° C. and exhibited an ultraviolet absorption λ max. 246 mμ, $E_{1cm}^{\%}$ 213 (isooctane solvent)

EXAMPLE 12

Preparation of 3,9,11-trihydroxy-Δ[7,22]-ergostadiene or 3,7,8-trihydroxy-Δ[9(11),22]-ergostadiene from ergosteryl D acetate

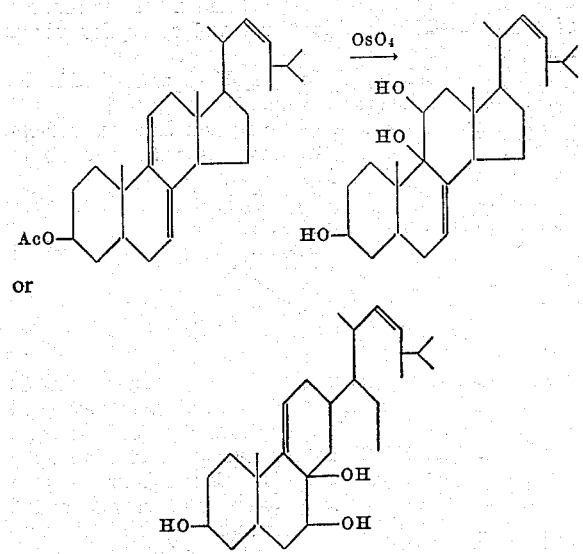

To 508 milligrams of osmium tetroxide in 25 cc. of ether was added 876 milligrams of ergosteryl D acetate together with four drops of pyridine. After standing for four days the reaction mixture was concentrated in vacuo. To the residue was added 15 cc. of 5% sodium hydroxide in methanol and 0.5 g. of mannitol and the mixture refluxed for fifteen minutes.

The reaction mixture was diluted with 35 cc. of water, whereupon the crude product separated from solution. Two recrystallizations from acetone yielded pure 3,9,11-trihydroxy - Δ[7,22] - ergostadiene (or 3,7,8 - trihydroxy- Δ[9(11),22]-ergostadiene) having a melting point of 194–195° C. Analysis indicated that the product was solvated with one mole of acetone.

Calculated for $C_{28}H_{46}O_3 \cdot CH_3COCH_3$: F, 76.18; H, 10.72. Found: C, 76.16; H, 10.40.

This compound was reacted with acetic anhydride and pyridine at room temperature to yield the corresponding diacetoxy derivative, 3,11-diacetoxy-9-hydroxy-Δ[7,22]-ergostadiene or 3,7-diacetoxy-8-hydroxy-Δ[9(11),22]-ergostadiene (having a melting point of 162.5–163° C.) from which the free hydroxy compound could be regenerated by hydrolysis.

Calculated for $C_{32}H_{50}O_5$: C, 74.61; H, 9.79. Found: C, 74.65; H, 10.02.

EXAMPLE 13

Preparation of 3,9,11-trihydroxy-Δ[7,22]-ergostadiene or 3,7,8-trihydroxy-Δ[9(11),22]-ergostadiene from ergosteryl D acetate A solution of 8.8 grams of ergosteryl D acetate in 150 cc. of ether and 4 cc. of pyridine was treated with 5.1 grams of osmium tetroxide. After three days at room temperature, the dark reaction mixture containing solid osmate ester, was stirred with 100 cc. of 2.5 N sodium hydroxide containing 5.0 grams of mannitol for 16 hours. During this period, the ether evaporated and a practically colorless, crystalline product was obtained, which consisted of 3-acetoxy-9,11-dihydroxy-Δ[7,22]-ergostadiene or 3-acetoxy-7,8-dihydroxy-Δ[9(11),22]-ergostadiene and the corresponding trihydroxy compound, 3,9,11-trihydroxy-Δ[7,22]-ergostadiene (or 3,7,8-trihydroxy-Δ[9(11),22]-ergostadiene).

Chromatography of the crude product over alumina yielded the pure crystalline 3-acetoxy-compound as well as some of the expected trihydroxy compound. The residue from the ether -20% acetone eluate crystallized from acetone to give needles of 3-acetoxy-9,11-dihydroxy-Δ$^{7,22}$-ergostadiene or 3-acetoxy-7,8-dihydroxy-Δ$^{9(11),22}$-ergostadiene, having a melting point of 171.5–175° C.

Calculated for $C_{30}H_{48}O_5$: C, 76.22; H, 10.24. Found: C, 76.26; H, 10.05.

This product reacted with acetic anhydride-pyridine to give a diacetoxy compound identical with the product obtained in Example 12, 3,11-diacetoxy-9-hydroxy-Δ$^{7,22}$-ergostadiene or 3,7-diacetoxy-8-hydroxy-Δ$^{9(11),22}$-ergostadiene, and had a melting point of 162.1–163° C.

EXAMPLE 14

*Preparation of 3-hydroxy-7-keto-Δ$^{8,22}$-ergostadiene and 3-hydroxy-7-keto-Δ$^{9(11),22}$-ergostadiene from 3,7,8-trihydroxy-Δ$^{9(11),22}$-ergostadiene (or 3,9,11-trihydroxy-Δ$^{7,22}$-ergostadiene)*

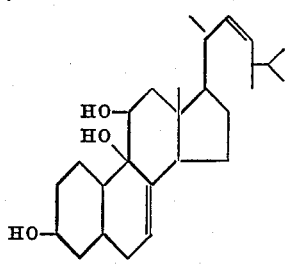

or

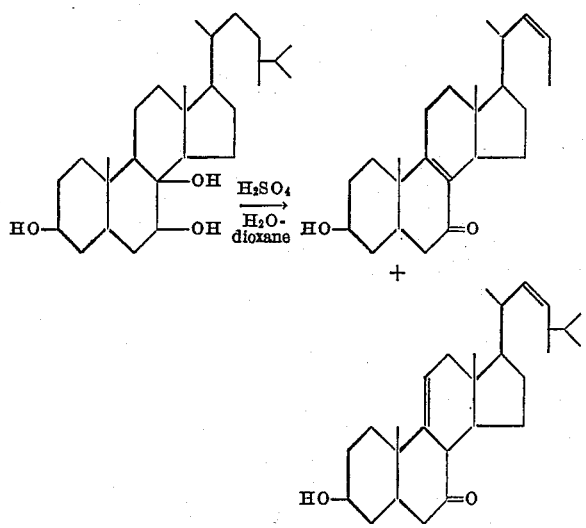

One hundred milligrams of 3,9,11-trihydroxy-Δ$^{7,22}$-ergostadiene (or 3,7,8,-trihydroxy-Δ$^{9(11),22}$-ergostadiene) was heated with 4 cc. of dioxane, 1 cc. of water and 0.2 cc. of 2 N sulfuric acid on the steam bath for 2 hours. The mixture of 3-hydroxy-7-keto-Δ$^{8,22}$-ergostadiene and 3-hydroxy-7-keto-Δ$^{9(11),22}$-ergostadiene melted at 151–157° C., and exhibited an ultraviolet adsorption λ max. 246 mμ, $E^{\%}_{1\,cm.}$ 188 (isooctane solvent)

Various changes and modifications may be made in carrying out the present invention without departing from the spirit and scope thereof. Insofar as these changes and modifications are within the purview of the annexed claims, they are to be considered as part of our invention.

What is claimed is:

1. Trihydroxy compound selected from the group consisting of

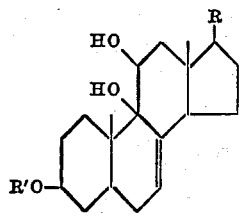

and

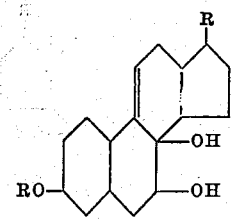

wherein R is selected from the group consisting of an ergosterol side chain, a cholanic acid side chain and an esterified cholanic acid side chain and R' is selected from the group consisting of acyl and hydrogen.

2. 3,7,8-trihydroxy-Δ$^{9(11),22}$-ergostadiene.

3. 3,9,11-trihydroxy-Δ$^{7,22}$-ergostadiene.

4. 3,7-diacetoxy-8-hydroxy-Δ$^{9(11),22}$-ergostadiene.

5. 3,11-diacetoxy-9-hydroxy-Δ$^{7,22}$-ergostadiene.

6. A compound selected from the group consisting of 3-acetoxy-7,8-dihydroxy-Δ$^{9(11),22}$-ergostadiene and 3-acetoxy-9,11-dihydroxy-Δ$^{7,22}$-ergostadiene.

7. The process which comprises reacting ergosteryl D acetate with osmium tetroxide to form the osmate ester of ergosteryl D acetate, hydrolyzing the latter compound to form 3,9,11-trihydroxy-Δ$^{7,22}$-ergostadiene reacting the latter compound with aqueous acidic acid to form a mixture of 3-hydroxy-7-keto-Δ$^{8,22}$-ergostadiene and 3-hydroxy-7-keto-Δ$^{9(11),22}$-ergostadiene.

8. The process which comprises reacting ergosteryl D acetate with osmium tetroxide to form the osmate ester of ergosteryl D acetate, hydrolyzing the latter compound to form 3,7,8-trihydroxy-Δ$^{9(11),22}$-ergostadiene reacting the latter compound with aqueous acidic acid to form a mixture of 3-hydroxy-7-keto-Δ$^{8,22}$-ergostadiene and 3-hydroxy-7-keto-Δ$^{9(11),22}$-ergostadiene.

9. The process which comprises reacting ergosteryl D acetate with osmium tetroxide to form the osmate ester of ergosteryl D acetate, and hydrolyzing the latter compound to form 3,9,11-trihydroxy-Δ$^{7,22}$-ergostadiene.

10. The process which comprises reacting ergosteryl D acetate with osmium tetroxide to form the osmate ester of ergosteryl D acetate, and hydrolyzing the latter compound to form 3,7,8-trihydroxy-Δ$^{9(11),22}$-ergostadiene.

11. The process which comprises reacting 3,9,11-trihydroxy-Δ$^{7,22}$-ergostadiene with aqueous acidic acid to form a mixture of 3-hydroxy-7-keto-Δ$^{8,22}$-ergostadiene and 3-hydroxy-7-keto-Δ$^{9(11),22}$-ergostadiene.

12. The process which comprises reacting 3,7,8-trihydroxy-Δ$^{9(11),22}$-ergostadiene with aqueous acidic acid to form a mixture of 3-hydroxy-7-keto-Δ$^{8,22}$-ergostadiene and 3-hydroxy-7-keto-Δ$^{9(11),22}$-ergostadiene.

13. The process which comprises reacting a compound of the formula

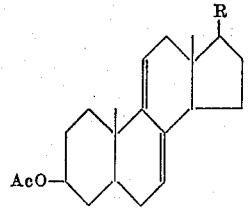

wherein R is selected from the group consisting of an ergosterol side chain, a cholanic acid side chain and an esterified cholanic acid side chain with osmium tetroxide to form the osmate ester, hydrolyzing the osmate ester to form a mixture of the following compounds

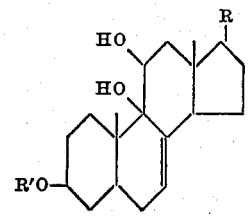

and
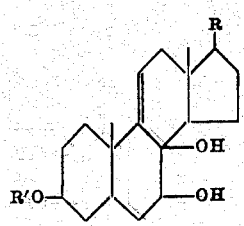
wherein R is as above and R' is selected from the group consisting of acyl and hydrogen; and separating the above mixture.
References Cited in the file of this patent
UNITED STATES PATENTS
Re. 22,941    Reichstein _____ Nov. 25, 1947